United States Patent
Grover

(10) Patent No.: US 6,594,745 B2
(45) Date of Patent: Jul. 15, 2003

(54) MIRRORING AGENT ACCESSIBLE TO REMOTE HOST COMPUTERS, AND ACCESSING REMOTE DATA-STORAGE DEVICES, VIA A COMMUNCATIONS MEDIUM

(75) Inventor: Rajiv K. Grover, Folsom, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 86 days.

(21) Appl. No.: 09/775,013

(22) Filed: Jan. 31, 2001

(65) Prior Publication Data

US 2002/0103968 A1 Aug. 1, 2002

(51) Int. Cl.[7] ............................................... G06F 12/00
(52) U.S. Cl. ..................... 711/162; 711/112; 711/114; 711/202; 711/206
(58) Field of Search ........................ 711/114, 162, 711/112, 202, 206

(56) References Cited

U.S. PATENT DOCUMENTS

| 5,941,972 A | | 8/1999 | Hoese .......................... 710/315 |
| 5,987,566 A | | 11/1999 | Vishlitzky et al. ........... 711/114 |
| 6,041,381 A | | 3/2000 | Hoese .......................... 710/315 |
| 6,067,199 A | * | 5/2000 | Blumenau .................... 360/48 |
| 6,256,748 B1 | * | 7/2001 | Pinson .......................... 714/6 |
| 6,311,251 B1 | * | 10/2001 | Merritt et al. ............... 711/114 |

OTHER PUBLICATIONS

Crossroads Systems, Inc., "The Case for Storage Virtualization Using Intelligent Routers" Internet Article, Jan. 1, 2001.

* cited by examiner

Primary Examiner—Reginald G. Bragdon
Assistant Examiner—Mehdi Namazi

(57) ABSTRACT

A hardware-based mirroring agent that provides a LUN-based I/O interface to remote host computers, including mirrored LUNs, implemented via remote data storage devices. The hardware-based mirroring agent is similar to a disk array, but manages and provides to host computers an interface to remote data storage devices, rather than to internal data storage devices, as in the case of disk arrays.

14 Claims, 16 Drawing Sheets

MIRRORING AGENT ACCESSIBLE TO REMOTE HOST COMPUTERS, AND ACCESSING REMOTE DATA-STORAGE DEVICES, VIA A COMMUNCATIONS MEDIUM

TECHNICAL FIELD

The present invention is related to replication and concurrent updating of multiple physical storage devices to provide fail-over data redundancy, and, in particular, to a hardware-based mirroring agent, interconnected with remote host computers and remote data-storage devices via a communications medium, that coordinates and manages mirroring of remote data-storage devices and that provides to host computers a simple interface to mirrored physical data-storage devices.

BACKGROUND OF THE INVENTION

The present invention relates to concurrently synchronized, redundant storage of data on multiple mass storage devices. The present invention is described and illustrated with reference to an embodiment similar, in many respects, to a disk array that services I/O requests from a number of remote computers. Therefore, an overview of mass storage devices, disk arrays, and disk mirroring is provided, below.

FIG. 1 illustrates data storage within a platter of a hard disk drive. The platter is a thin disk, coated with a magnetic medium, such as iron oxide. Data can be stored in tiny areas of the surface of the platter having induced, stable magnetic fields. The surface of the disk platter 102 is divided into concentric rings, or tracks, such as tracks 104–105 in FIG. 1. Current disk platters contain many thousands of tracks. Each track is divided into radial segments, or sectors, such as sector 106 of track 104 in FIG. 1. Sectors each normally comprise a fixed number of bytes, normally 256, 512, 1024, or 2048 bytes. Data is normally retrieved from, and stored to, a hard disk drive in units of sectors. Once a sector is read from a disk and stored into computer memory, a program may access individual bytes and bits within the sector by accessing the random memory in which the sector is stored. Thus, the physical location of data on a disk platter can be described by a starting location and an ending location, each location specified as a track/sector/byte triple. Normally, a hard disk drive contains a number of platters aligned in parallel along a spindle passing through the center of each platter. Typically, the track and sectors of the platter can be thought of as aligned to form cylinders spanning the platters. In such hard disk drives, the physical address of a byte of data may also be described by a track/sector/byte triplet, where the byte within an aligned group of sectors composing a section of a cylinder are consecutively ordered.

FIG. 2 is a block diagram of a standard disk drive. The disk drive 201 receives input/output ("I/O") requests from remote computers via a communications medium 202 such as a computer bus, fibre channel, or other such electronic communications medium. For many types of storage devices, including the disk drive 201 illustrated in FIG. 2, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 202 to a remote computer, and as a result of a WRITE operation, data is received from a remote computer by the storage device via communications medium 202 and stored within the storage device.

The disk drive storage device illustrated in FIG. 2 includes controller hardware and logic 203 including electronic memory, one or more processors or processing circuits, and controller firmware, and also includes a number of disk platters 204 coated with a magnetic medium for storing electronic data. The disk drive contains many other components not shown in FIG. 2, including read/write heads, a high-speed electronic motor, a drive shaft, and other electronic, mechanical, and electromechanical components. The memory within the disk drive includes a request/reply buffer 205 which stores I/O requests received from remote computers and an I/O queue 206 that stores internal I/O commands corresponding to the I/O requests stored within the request/reply buffer 205. Communication between remote computers and the disk drive, translation of I/O requests into internal I/O commands, and management of the I/O queue, among other things, are carried out by the disk drive I/O controller as specified by disk drive I/O controller firmware 207. Translation of internal I/O commands into electromechanical disk operations in which data is stored onto, or retrieved from, the disk platters 204 is carried out by the disk drive I/O controller as specified by disk media read/write management firmware 208. Thus, the disk drive I/O control firmware 207 and the disk media read/write management firmware 208, along with the processors and memory that enable execution of the firmware, compose the disk drive controller.

Individual disk drives, such as the disk drive illustrated in FIG. 2, are normally connected to, and used by, a single remote computer, although it has been common to provide dual-ported disk drives for concurrent use by two computers and multi-host-accessible disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 2, into a disk array device, increasing both the storage capacity as well as increasing the capacity for parallel I/O request servicing by concurrent operation of the multiple disk drives contained within the disk array.

FIG. 3 is a simple block diagram of a disk array. The disk array 302 includes a number of disk drive devices 303, 304, and 305. In FIG. 3, for simplicity of illustration, only three individual disk drives are shown within the disk array, but disk arrays may contain many tens or hundreds of individual disk drives. A disk array contains a disk array controller 306 and cache memory 307. Generally, data retrieved from disk drives in response to READ requests may be stored within the cache memory 307 so that subsequent requests for the same data can be more quickly satisfied by reading the data from the quickly accessible cache memory rather than from the much slower electromechanical disk drives. Various elaborate mechanisms are employed to maintain, within the cache memory 307, data that has the greatest chance of being subsequently re-requested within a reasonable amount of time. The disk array controller 306 may also elect to store data received from remote computers via WRITE requests in cache memory 307 in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 308–315 provided by the disk array via internal disk drives 303–305 and the disk array controller 306. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

While the disk array, as described above, provides data storage within, and addressed relative to, LUNs, high-level application programs ("APPs") executing on host computers access data stored within LUNs via a number of higher-level abstractions. FIG. 3 illustrates the hierarchical data abstraction levels within a host computer/disk array system. Each block in FIG. 4 represents a separate program, program/hardware, or hardware component within the host computer/disk array system. As discussed above, the disk array 402 accesses data stored within internal disks via internal physical addresses that each contain indications of a disk, a track within a disk, a sector within the track, and a byte within the sector. However, as discussed above, the disk array provides data access and storage to virtual storage spaces, called LUNs, each LUN having some fixed number of addressable units, such as bytes. The two abstractions 404 and 406 in FIG. 4 are linked to operating system components that execute within the operating system of a host computer interconnected with a disk array. The first component is a volume manager 404. This component interacts with a disk array via a communications medium, accessing and storing data relative to the LUN abstraction provided by the disk array. The volume manager 404 presents a different interface to components above the volume manager in the abstraction hierarchy. The volume manager provides volumes which have volume names and which contain a linear address space of bytes, words, or some other convenient addressable entity. The volume manager may map a volume onto one or more LUNs, translating volume-relative addresses received from higher-level components into LUN-based data addresses that the volume manager then passes to the disk array. In addition, the volume manager can increase the size of a logical volume using an arbitrary LUN, which can quickly change the physical location of the entirety of a logical object.

The next highest component shown in FIG. 4 is the operating system's file manager 406. The file manager provides a logical object interface to the highest-level component, an executing APP 408. Most logical objects currently provided by file managers and used by APPs are called "files." Files are arbitrarily sized, consecutive sequences of data bytes, described by file names, that are stored on a mass storage device and read from, and written to, via operating-system-provided I/O commands. A file manager provides a hierarchical, multi-component file name space to allow an APP or user to organize files within hierarchical directories. The file manager translates a file name, including the directory and subdirectory prefixes within the file name, to a range of consecutive addressable entities, such as bytes, within a volume. An APP 408, or a human user interacting with the APP, stores data to, and accesses data from, a mass storage device, such as a disk array, in terms of named logical objects.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored.

FIG. 5 illustrates object-level mirroring. In FIG. 5, a primary data object "$O_3$" 501 is stored on LUN A 502. The mirror object, or backup copy, "$O_3$" 503 is stored on LUN B 504. The arrows in FIG. 5, such as arrow 505, indicate I/O WRITE requests directed to various objects stored on a LUN. I/O WRITE requests directed to object "$O_3$" are represented by arrow 506. When object-level mirroring is enabled, the disk array controller providing LUNs A and B automatically generates a second I/O WRITE request from each I/O WRITE request 506 directed to LUN A, and directs the second generated I/O WRITE request via path 507, switch "$S_1$" 508, and path 509 to the mirror object "$O_3$" 503 stored on LUN B 504. In FIG. 5, enablement of mirroring is logically represented by switch "$S_1$" 508 being on. Thus, when object-level mirroring is enabled, any I/O WRITE request, or any other type of I/O operation that changes the representation of object "$O_3$" 501 on LUN A, is automatically mirrored by the disk array controller to identically change the mirror object "$O_3$" 503. Mirroring can be disabled, represented in FIG. 5 by switch "$S_1$" 508 being in an off position. In that case, changes to the primary data object "$O_3$" 501 are no longer automatically reflected in the mirror object "$O_3$" 503. Thus, at the point that mirroring is disabled, the stored representation, or state, of the primary data object "$O_3$" 501 may diverge from the stored representation, or state, of the mirror object "$O_3$" 503. Once the primary and mirror copies of an object have diverged, the two copies can be brought back to identical representations, or states, by a resync operation represented in FIG. 5 by switch "$S_2$" 510 being in an on position. In the normal mirroring operation, switch "$S_2$" 510 is in the off position. During the resync operation, any I/O operations that occurred after mirroring was disabled are logically issued by the disk array controller to the mirror copy of the object via path 511, switch "$S_2$," and pass 509. During resync, switch "$S_1$" is in the off position. Once the resync operation is complete, logical switch "$S_2$" is disabled and logical switch "$S_1$" 508 can be turned on in order to reenable mirroring so that subsequent I/O WRITE requests or other I/O operations that change the storage state of primary data object "$O_3$," are automatically reflected to the mirror object "$O_3$" 503. Another operation generally provided as part of mirroring is an instant snapshot feature. Upon receiving a request for an instant snapshot, the disk array controller copies the contents of either LUN A or LUN B to a specified LUN, providing an incremental backup of the contents of the mirrored LUNS at a specified point in time.

FIG. 6 illustrates a hypothetical computing environment including host computers and data-storage devices interconnected by a communications medium. The communications environment illustrated in FIG. 6 will be reused repeatedly in subsequent discussions to illustrate current mirroring techniques and, later, to illustrate one embodiment of the present invention. Subsequent illustrations based on FIG. 6 will employ numerical labels identical to numerical labels employed in FIG. 6, for the sake of clarity. In FIG. 6, a first, logically circular communications medium 602, such as a fibre channel arbitrated loop, is interconnected through a router or bridge device 604 to a second, logically circular communications medium 606. Host computers 608 and 609, disk arrays 610–612, and storage devices 614–616 are directly connected to communications medium 602, while host computers 618–619, disk arrays 620–621, and storage devices 622–627 are directly connected to logically circular communications medium 606. In this environment, LUN 2 628 of disk array 612 is a mirror copy of data storage device 616, and disk storage device 624 is a mirror copy of disk storage device 623, as indicated in FIG. 6 by dashed arrows 629 and 630, respectively. Of course, an administrator of the computing environment illustrated in FIG. 6 can choose to mirror any number of data storage devices illustrated in FIG. 6 in any number of different ways. The mirroring illustrated in FIG. 6 is a hypothetical example used to illustrate currently available mirroring techniques and an embodiment of the present invention.

Currently, three general types of mirroring techniques are employed to provide fail-over data redundancy within computing environments, such as the computing environment illustrated in FIG. 6. FIG. 7 illustrates a host-computer-based mirroring technique. In FIG. 7, the host computer 702 manages mirroring of LUN 2 704 of disk array 706 and a storage device 708 interconnected with each other and with host computer 702 via a communications medium 710. This technique might be employed, for example, by host computer 608 to mirror LUN 2 628 of disk array 612 and data storage device 616 in FIG. 6. In this host-computer-based mirroring technique, the host computer maintains one or more internal tables 712 that store a representation of the fact that LUN 2 704 of disk array 706 is a mirror copy of data storage device 708. Often, this table or tables will be maintained within the volume manager of the host computer, although mirroring can be managed at various levels within a host computer, including various levels within the host computer's operating system. Generally, when a program on the host computer issues a I/O WRITE request directed to one of the two mirrored data-storage devices 704 and 708, the operating system of host computer 702 automatically generates a second I/O WRITE request directed to the other of the two mirrored data-storage devices 704 and 708. Read operations and other operations that do not effect the data storage state of the data-storage devices need not be duplicated.

Unfortunately, the host-computer-based mirroring technique illustrated in FIG. 7 has a number of significant disadvantages. First, the implementation of this mirroring technique is highly operating-system specific, and thus may need to be separately implemented for each different type of host computer within a computing environment. Moreover, either the mirroring is only available to host computer 702, and not to other host computers interconnected with communications medium 710, or I/O WRITE requests directed to mirrored data-storage devices 704 and 708 must be coordinated between host computers to very complex and error-prone protocols and procedures. Such coordination can lead to significant data storage inefficiencies, for example requiring host computer 702 to act in an intermediary role for I/O requests directed to mirror data-storage devices 704 and 708 by other host computers. Another disadvantage is that host computer represents a single point of failure for the mirroring of the two data storage devices.

FIG. 8 illustrates disk-array-based mirroring techniques. In FIG. 8, a table 802 storing indications of mirroring relationships between data-storage devices, such as data-storage devices 804–806 contained within the disk array 800, is maintained within the RAM memory 808 within the disk array 800, and is employed by the disk-array controller 810 to provide mirroring of data-storage devices contained within the disk array. For example, a computing environment administrator may issue commands to the disk-array controller810 to mirror data-storage devices 804 and 805. In response, the disk-array controller 810 stores an indication of this mirroring relationship in table 802 and issues appropriate I/O commands to bring the data state of data-storage devices 804 and 805 into correspondence with one another. Then, upon receipt of an I/O WRITE request directed to, for example, data storage device 804, the disk-array controller 810 accesses table 802, determines that data storage device 804 is mirrored with data storage device 805, and issues equivalent I/O WRITE requests to both data-storage devices 804 and 805. The mirroring operations are thus transparent to host computers.

Unfortunately, like the host-based mirroring technique illustrated in FIG. 7, the disk-array-based mirroring technique illustrated in FIG. 8 suffers from significant disadvantages. A core disadvantage is that only data-storage devices within disk array 800 can be mirrored. Thus, for example, in the hypothetical computing environment shown in FIG. 6, the disk-array-based mirroring techniques does not provide a way to mirror LUN 2 628 of disk array 612 and data storage device 616. The second disadvantage is that, analogously to the host-based mirroring technique illustrated in FIG. 7, the disk-array-based mirroring technique is quite specific to the internal disk-array controller implementation. Different disk-arrays may require significantly different implementations of the mirroring technique. A third distinct disadvantage is that the disk-array controller 810 and many other components of the disk-array 800 may become single points of failure that upon failure may prevent access to both data-storage devices of a mirrored data-storage-device pair.

FIG. 9 illustrates a specialized-hardware-based technique for data-storage-device mirroring. FIG. 9 illustrates the computing environment illustrated in FIG. 6 with the addition of specialized mirroring hardware. In FIG. 9, two mirroring devices 902 and 904 have been directly connected to logically circular communications media 602 and 606, respectively. Storage device 616 and disk array 612, formerly directly connected to communications medium 602, have been reconnected directly to mirroring device 902, and storage devices 623 and 624, formerly directly connected to communications medium 606, have been reconnected to mirroring device 904. Mirroring devices 902 and 904 present interfaces similar to the interface presented by a disk array, and contain controllers and other components, similar to those contained in a disk array, that service externally connected data-storage devices, such as data-storage devices 616, 623, 624, and disk array 612, rather than internal data-storage devices, as in disk arrays. Mirroring devices 902 and 904 detect received I/O WRITE requests directed to mirrored devices and generate appropriate additional I/O WRITE requests in order to maintain identical data states within mirrored data-storage devices connected to the mirroring devices 902 and 904.

Like the two previously discussed mirroring techniques, the specialized-hardware mirroring technique illustrated in FIG. 9 suffers from significant disadvantages. One disadvantage is that the number of data-storage devices that can be mirrored by a mirroring device, such as mirroring device 902, may be significantly constrained by the number and types of external connections provided by the mirroring device. A second disadvantage is that data-storage devices must be physically disconnected from a communications medium and reconnected to the device. Physical removal may then need to be carefully coordinated with complex reconfigurations of host computers and other devices connected to the original communications medium. As with the previously described disk-array-based mirroring technique, the mirroring device, such as mirroring device 902, may become a significant single point of failure with respect to the mirrored data-storage devices that the mirroring device controls.

Thus, as discussed above, while mirroring of data-storage devices provides convenient and needed data redundancy and enables rapid fail-over in the event of failure of a data storage device, many currently available mirroring techniques have significant disadvantages. For that reason, designer, manufacturers, and users of data-storage devices and host computers within computing environments have recognized the need for a convenient and robust method and system for effecting data-storage-device mirroring.

SUMMARY OF THE INVENTION

One embodiment of the present invention is a hardware-based mirroring agent that is interconnected, via a communications medium or media, to one or more remote host computers and to multiple remote data-storage devices. The hardware-based mirroring agent contains a RAM memory, controller, and controller routines and other firmware and software similar to the RAM memory, controller, and controller routines and other firmware and software contained in a disk array, and provides a data storage interface to the one or more host computers similar to that provided by a disk array. However, unlike disk arrays and the specialized-hardware-based mirroring devices discussed above, the hardware-based mirroring agent that represents one embodiment of the present invention neither contains internal data-storage devices accessible to remote host computers nor provides external connections for direct physical connection of data-storage devices to the specialized-hardware-based mirroring device. Instead, the hardware-based mirroring agent accesses remote data-storage devices via the communications medium, initializes and maintains mirror relationships between remote data-storage devices, and provides an interface to the mirrored remote data-storage devices to one or more host computers via the communications medium. The interface provided by the hardware-based mirroring agent is one or more virtual LUNs, a virtual LUN interface equivalent to a LUN interface provided by a disk array. A virtual LUN differs from a LUN in that a virtual LUN provided by a hardware-based mirroring agent stores data on, an retrieves data from, data storage devices remote from the hardware-based mirroring agent, whereas a LUN provided by a disk array stores data on, an retrieves data from, data storage devices included within the disk array. Virtual LUNs are accessed by host computers via a communications medium address associated with a hardware-based mirroring agent, just as LUNs are accessed by host computers via a communications medium address associated with a disk array or other type of data storage device. The hardware-based mirroring agent that represents one embodiment of the present invention is therefore essentially a diskless disk array that supports mirroring of remote disks, or other types of data-storage devices, although a hardware-based mirroring agent that includes an internal disk drive for storing mirroring-agent-internal data unavailable via the disk-array-like interface provided to host computers would also fall within the scope of the present invention.

Figure 1:
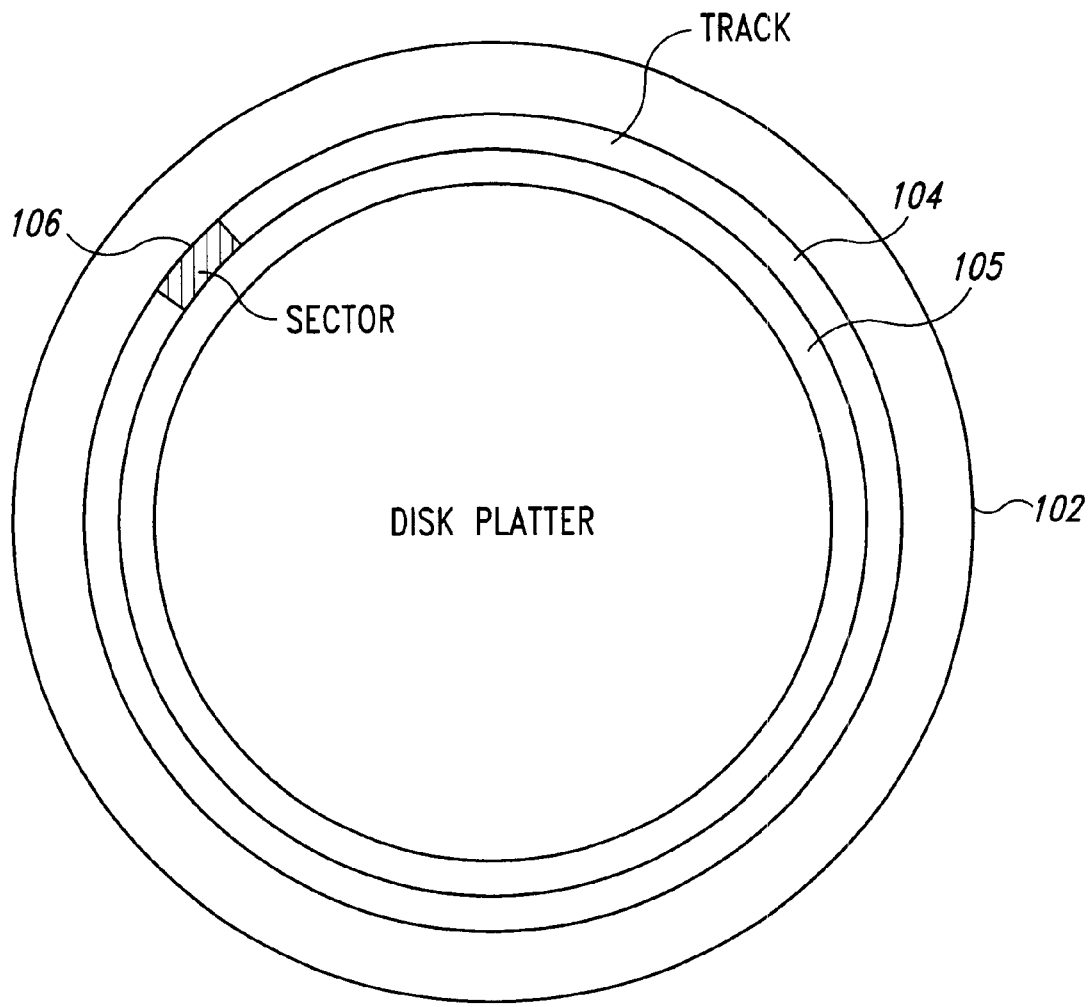
FIG. 1 illustrates data storage within a platter of a hard disk drive.
Figure 2:
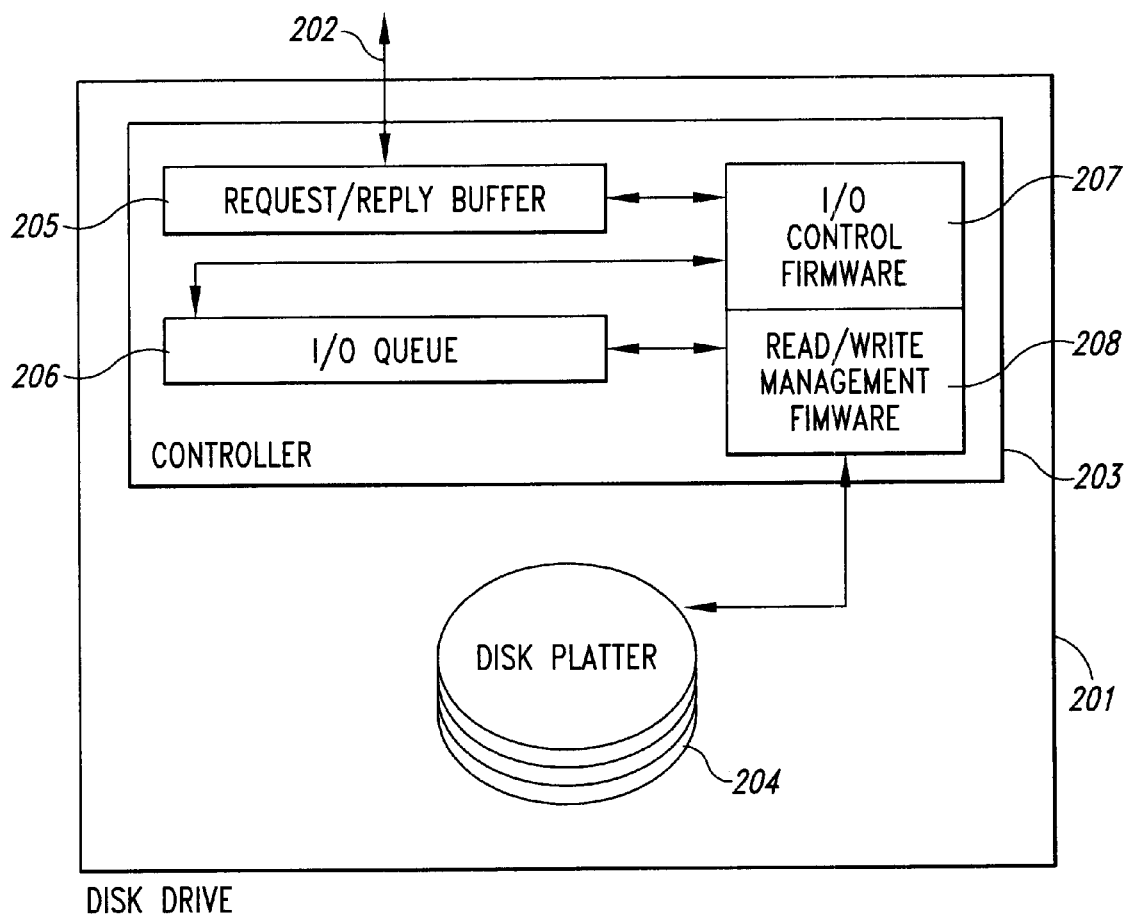
FIG. 2 is a block diagram of a standard disk drive.
Figure 3:
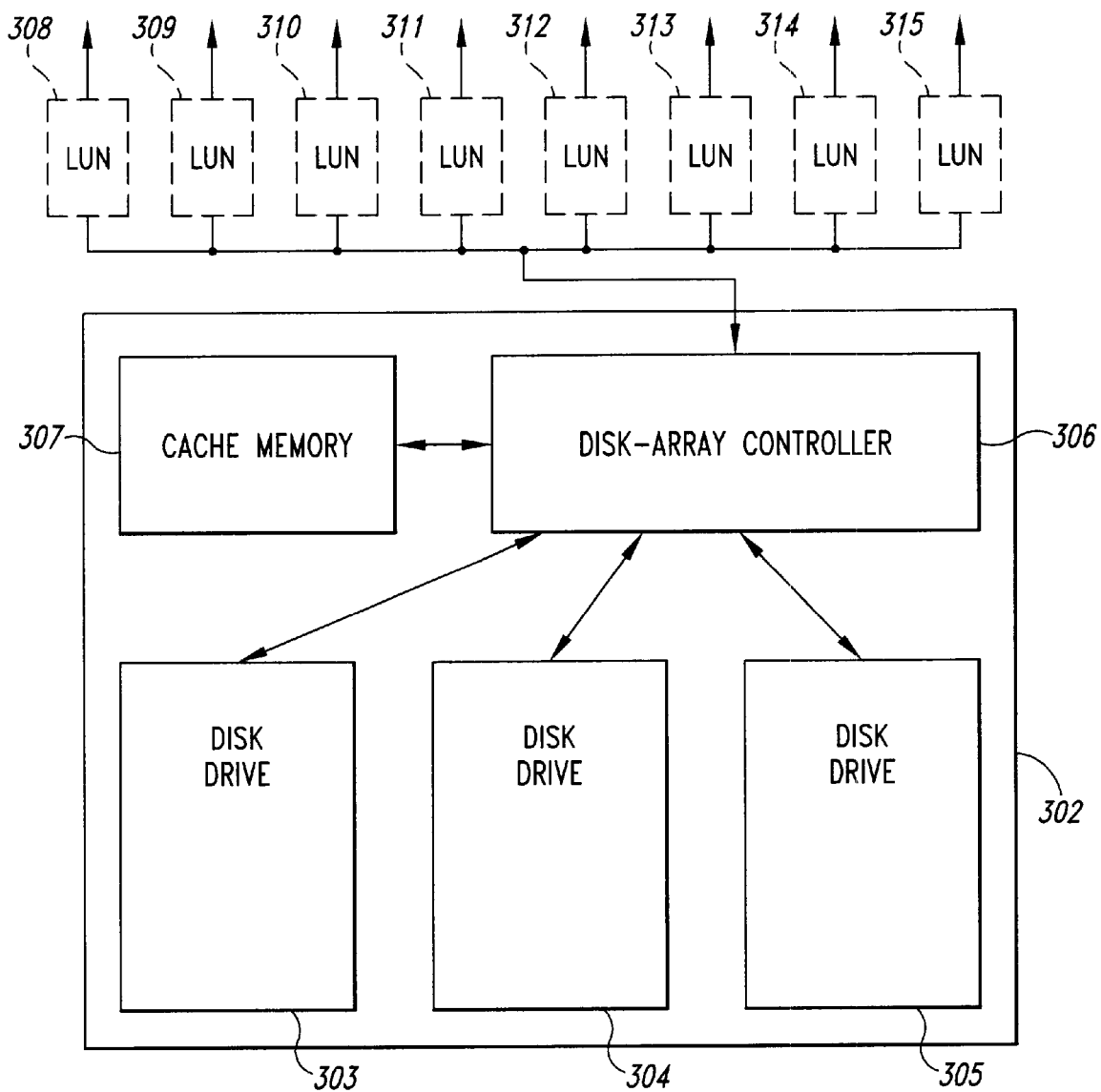
FIG. 3 is a simple block diagram of a disk array.
Figure 4:
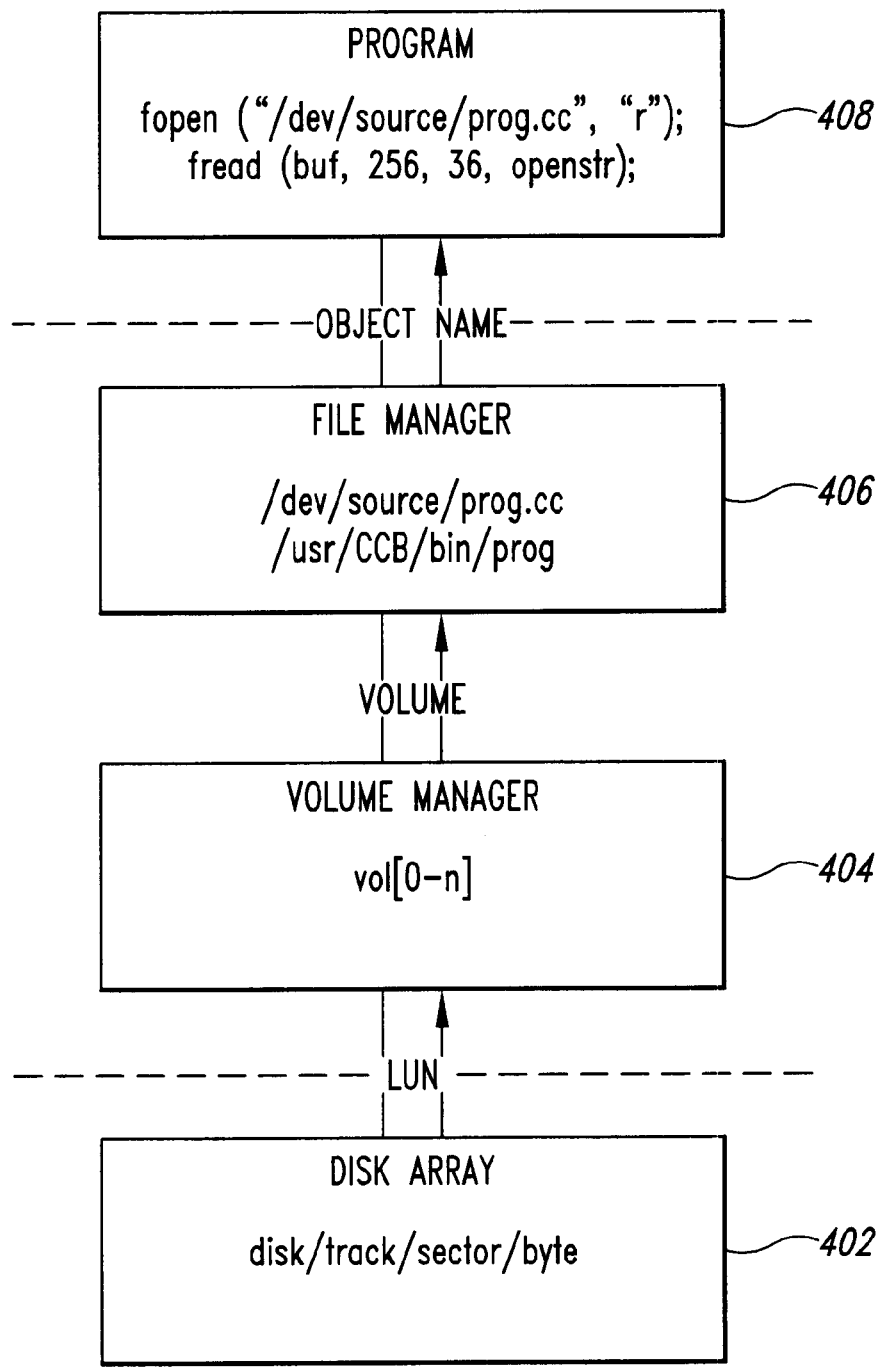

Each block in FIG. 4 represents a separate program, program/hardware, or hardware component within the host computer/disk array system.

Figure 5:
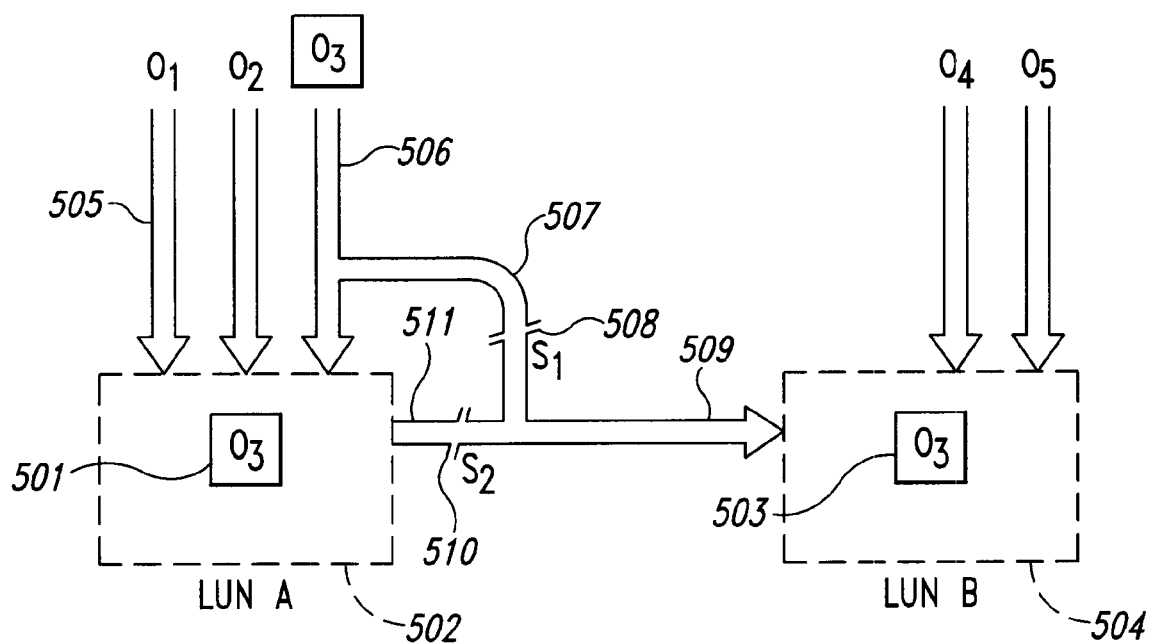

FIG. 5 illustrates object-level mirroring.

Figure 6:
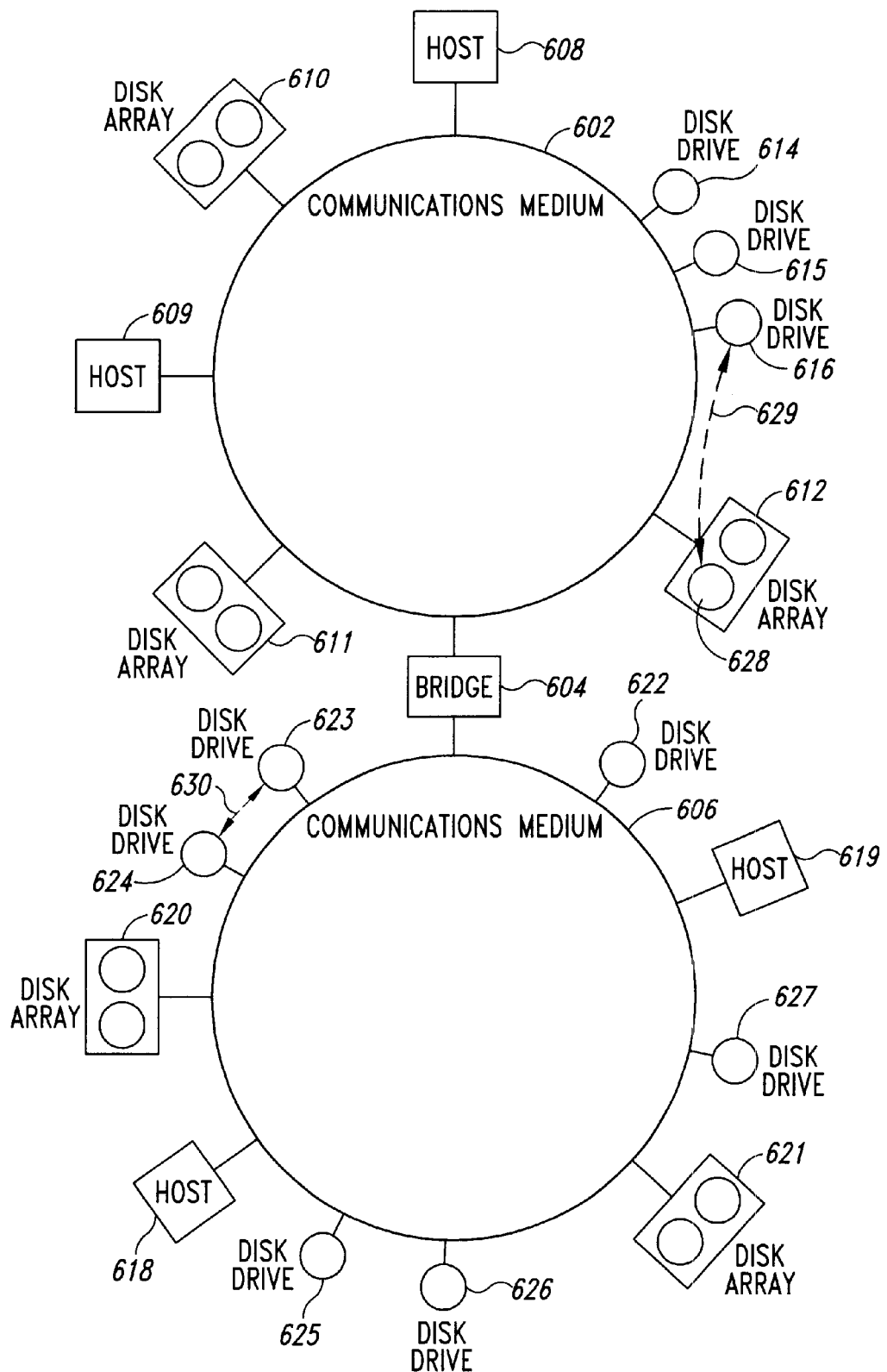

FIG. 6 illustrates a hypothetical computing environment including host computers and data-storage devices interconnected by a communications medium.

Figure 7:
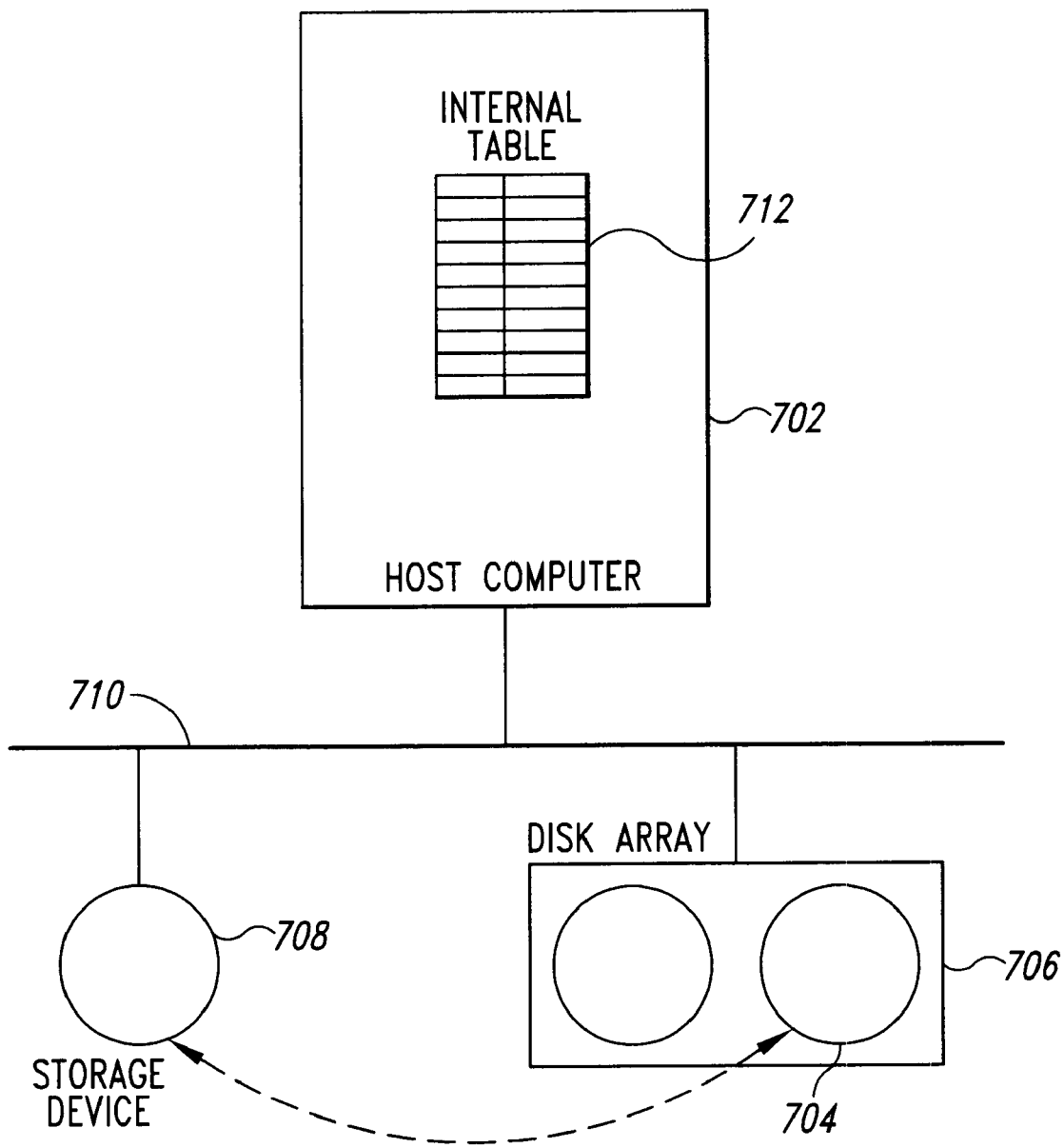

FIG. 7 illustrates a host-computer-based mirroring technique.

Figure 8:
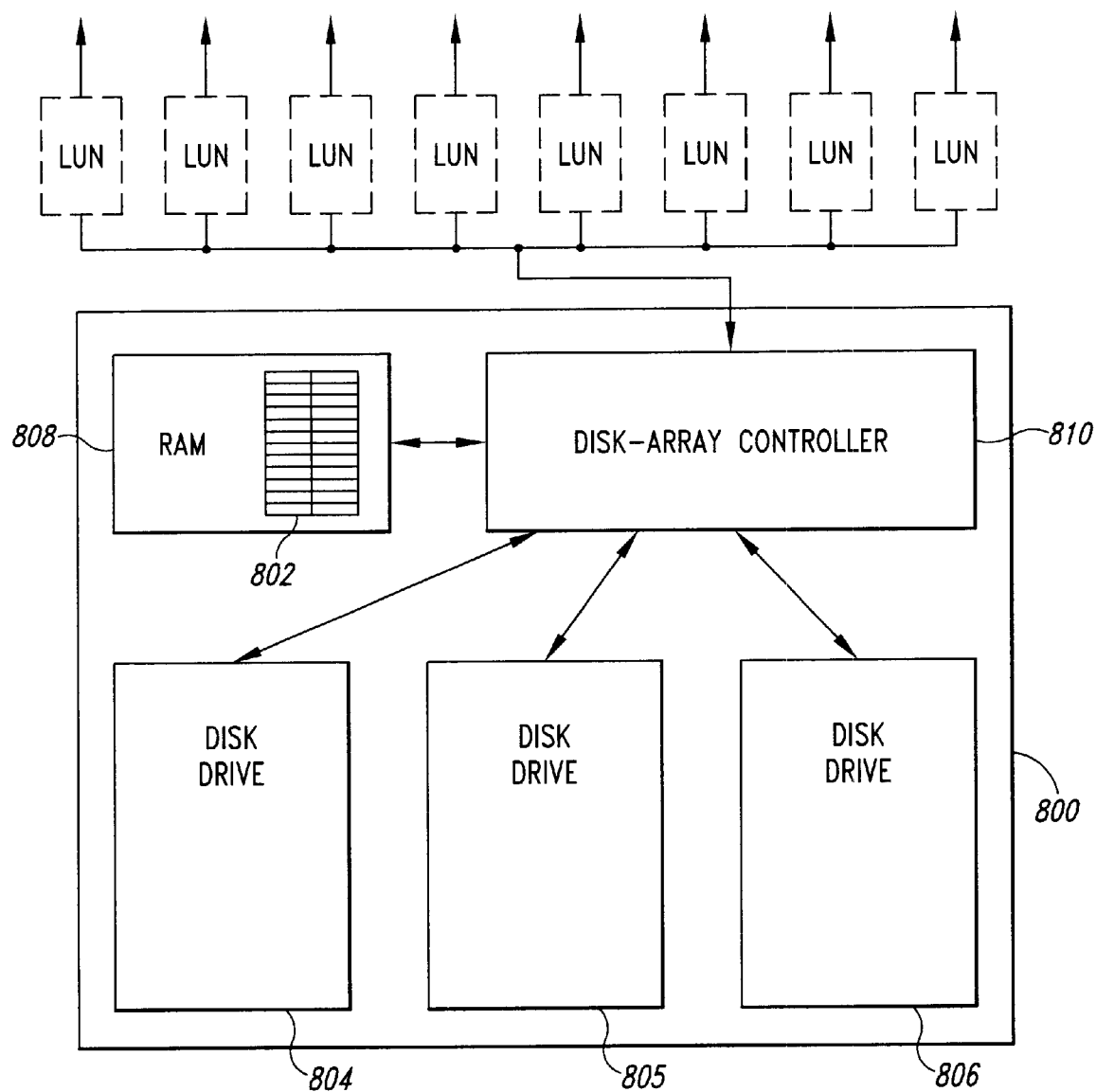

FIG. 8 illustrates disk-array-based mirroring techniques.

Figure 9:
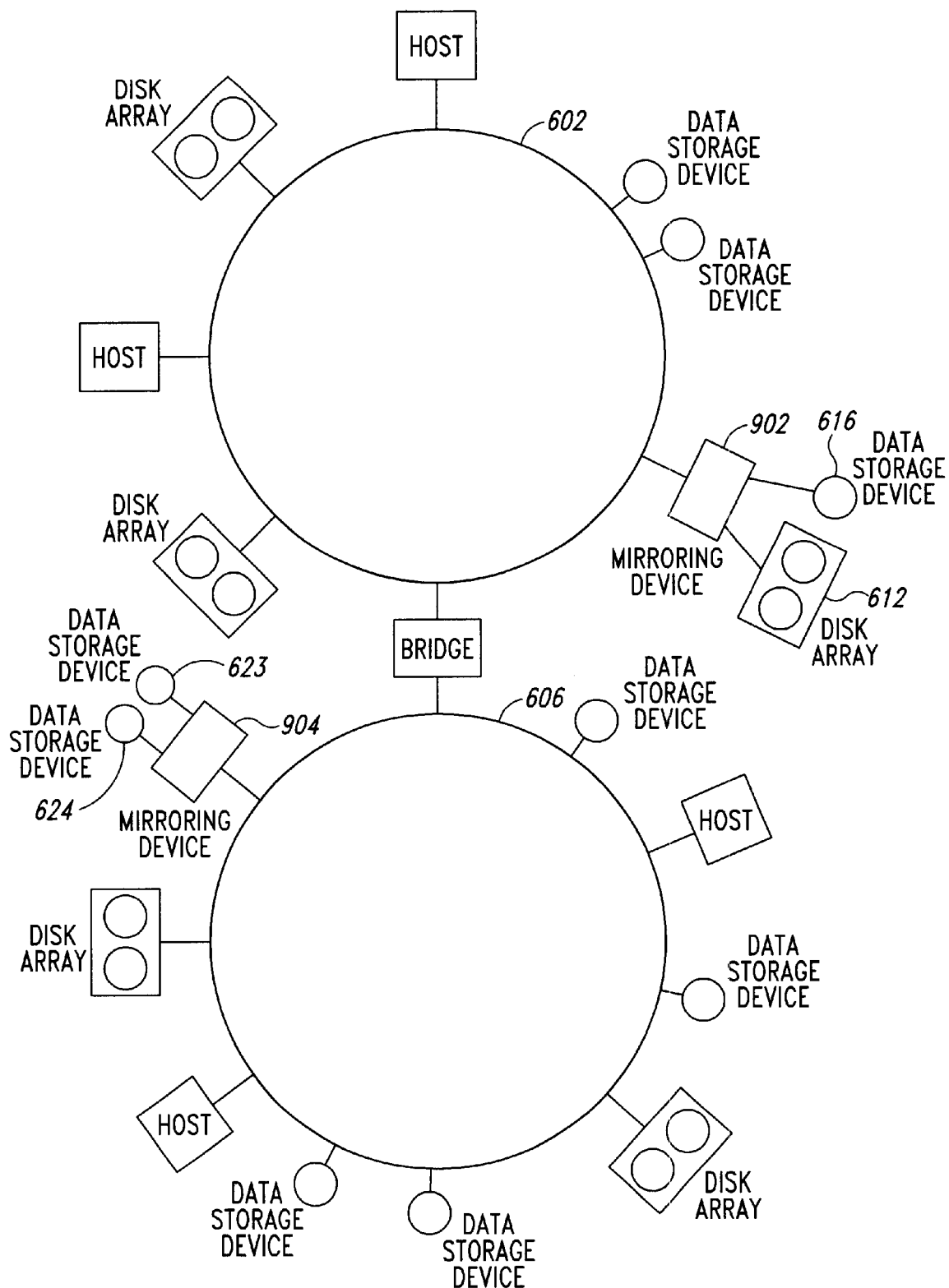

FIG. 9 illustrates a specialized-hardware-based technique for data-storage-device mirroring.

Figure 10:
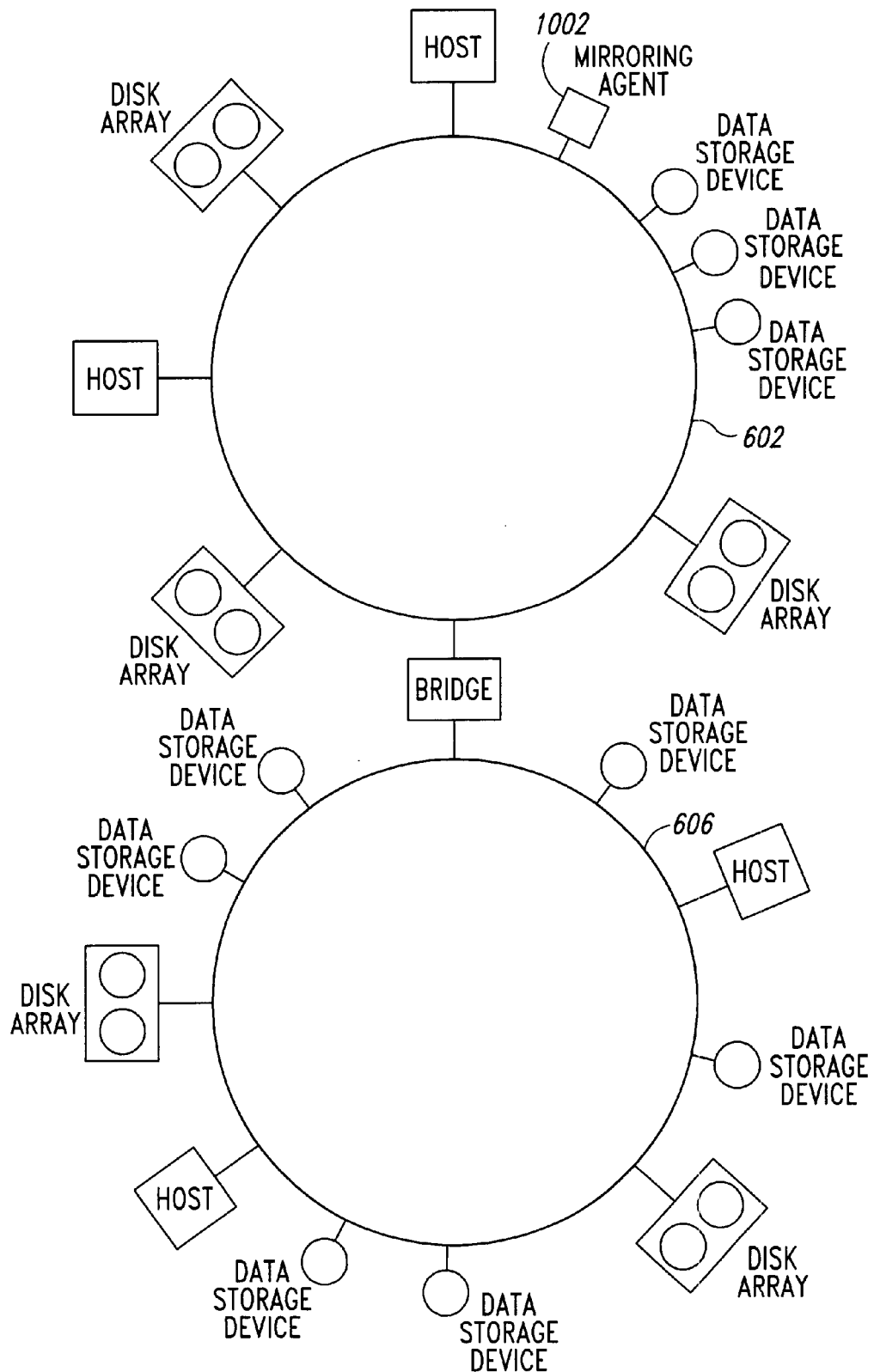

FIG. 10 shows the computing environment illustrated in FIG. 6 with the addition of a hardware-based mirroring agent that represents one embodiment of the present invention.

FIGS. 11–14 illustrate execution of I/O WRITE requests directed to a LUN provided via a disk-array-like interface by a mirroring agent.

Figure 15:
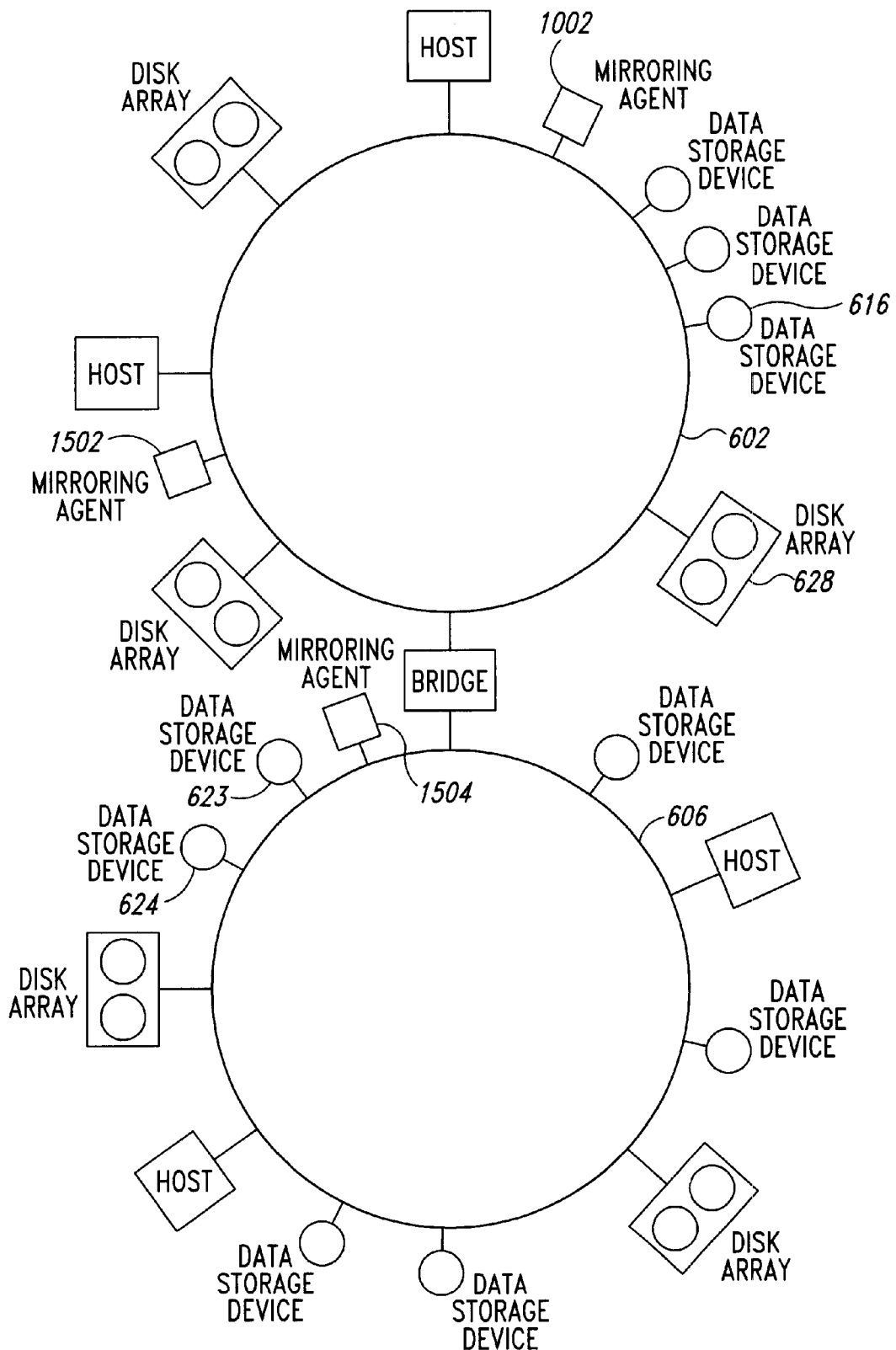

FIG. 15 shows the computing environment illustrated in FIG. 6 following addition of three mirroring agents 1002, 1502, and 1504.

Figure 16:
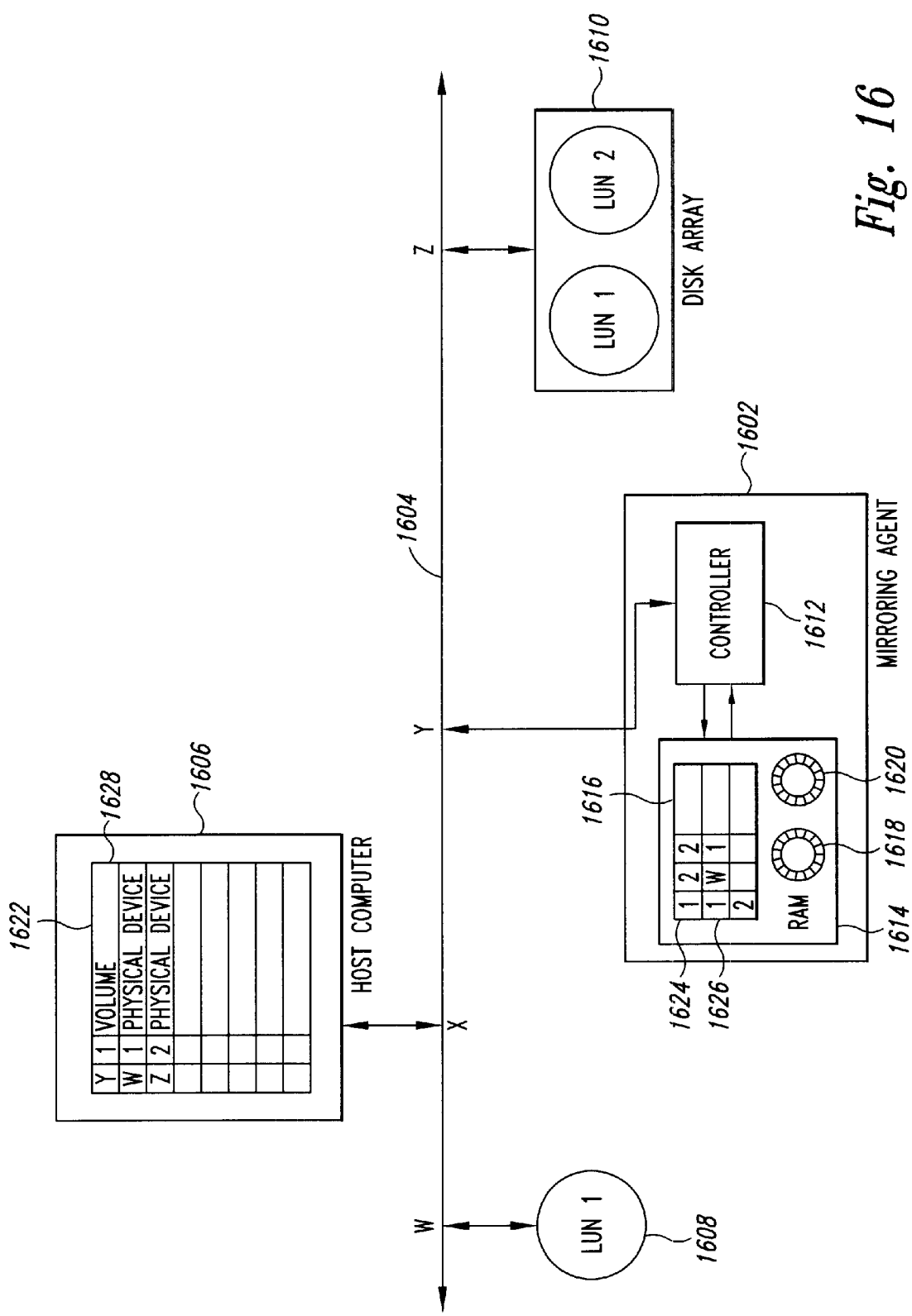

FIG. 16 illustrates the logical components of a mirrored data storage device environment provided to a host computer via an intermediary hardware-based mirroring agent that represents one embodiment of the present invention.

DETAILED DESCRIPTION OF THE INVENTION

One embodiment of the present invention is a hardware-based mirroring agent interconnected through one or more communications media, to remote host computers and remote data-storage devices. The hardware-based mirroring agent presents to host computers an interface similar to that presented by disk arrays, namely one or more LUNs accessible via the communications medium address of the mirroring agent. The mirroring agent implements this interface by directing I/O requests and commands to remote disk storage devices also accessible via one or more communications media. The mirroring agent is expressly designed to initialize and maintain mirror relationships between remote data-storage devices on behalf of the host computers, under control of a computing environment administrator, network administrator, or other configuration and management personnel. Alternatively, the mirroring agent may be automatically configured and managed via automated configuration and management tools implemented on a host computer or other computing device interconnected to the mirroring agent via a communications medium. The mirroring agent is thus similar to a disk array or to a specialized-hardware mirroring device described above, but without internal data-storage devices accessible externally to host computers and without data-storage devices directly coupled to the mirroring agent and accessible externally to host computers via a communications medium.

FIG. 10 shows the computing environment illustrated in FIG. 6 with the addition of a hardware-based mirroring agent that represents one embodiment of the present invention. The mirroring agent 1002 is directly connected to the communications medium 602, but also be directly connected to communications medium 606. Connected to either communications medium, mirroring agent 1002 can initialize and maintain the mirroring relationships illustrated in FIG. 6 for both communications medium 602 and communications medium 606.

Figure 11:
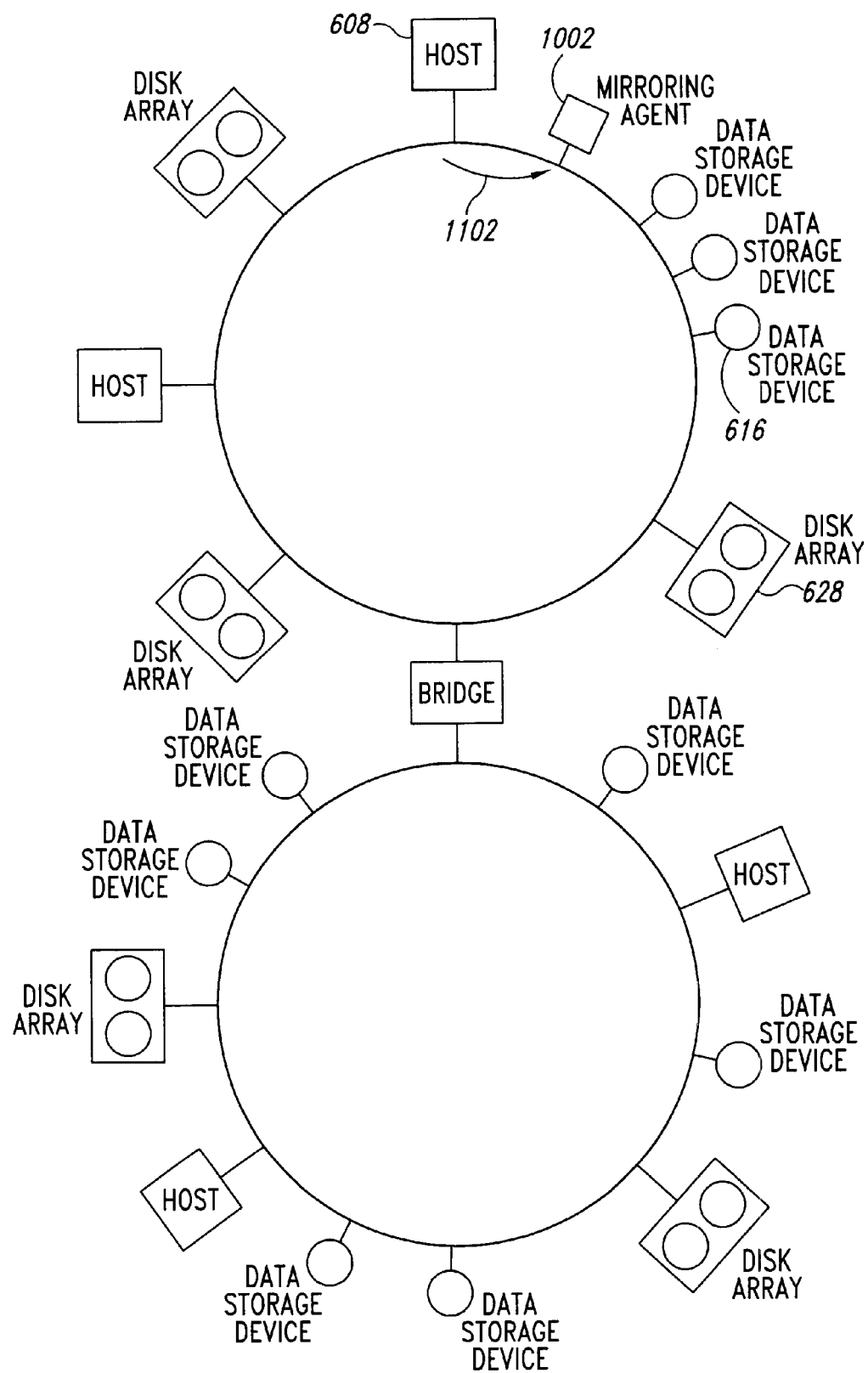
Figure 12:
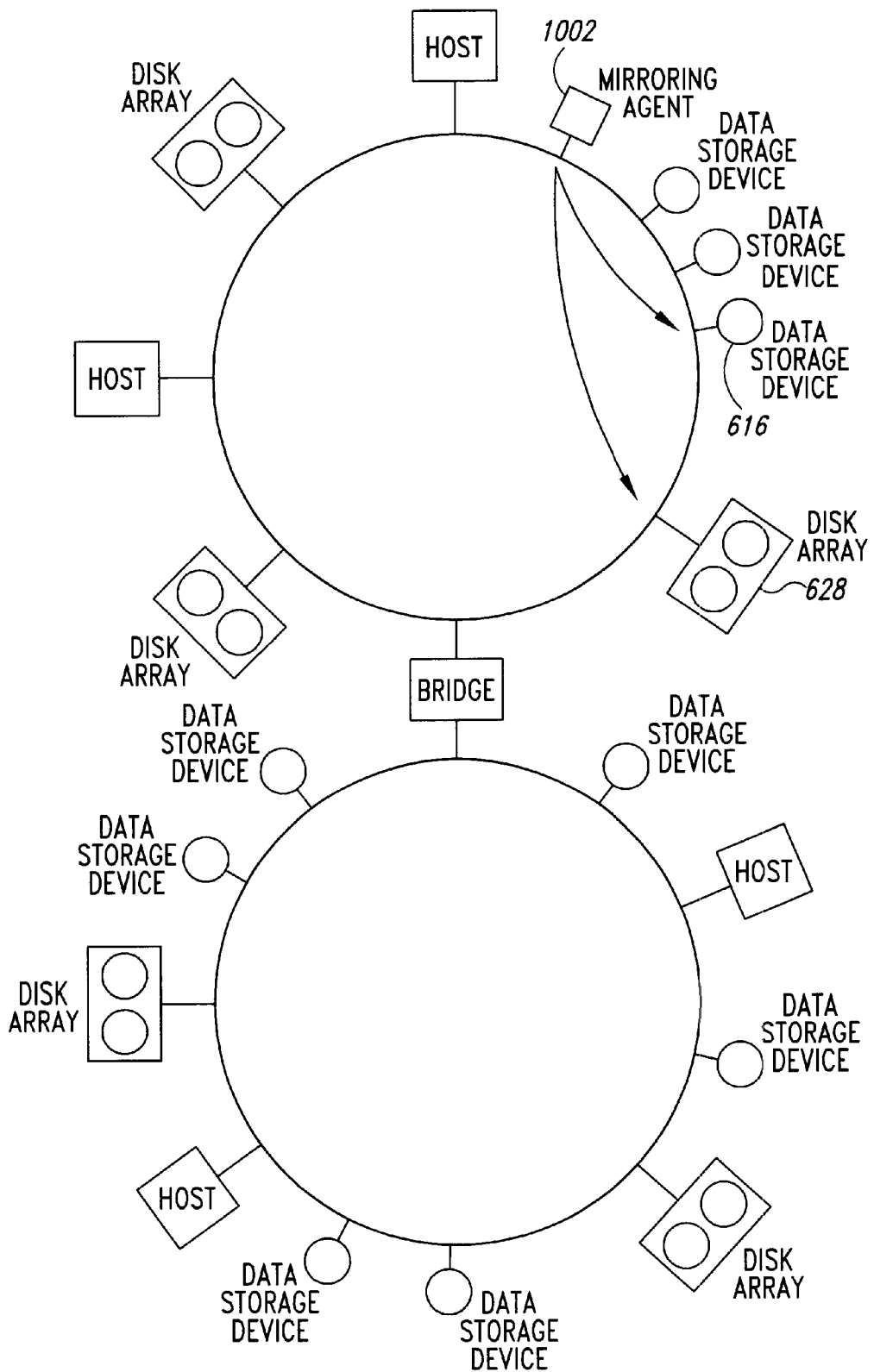
Figure 13:
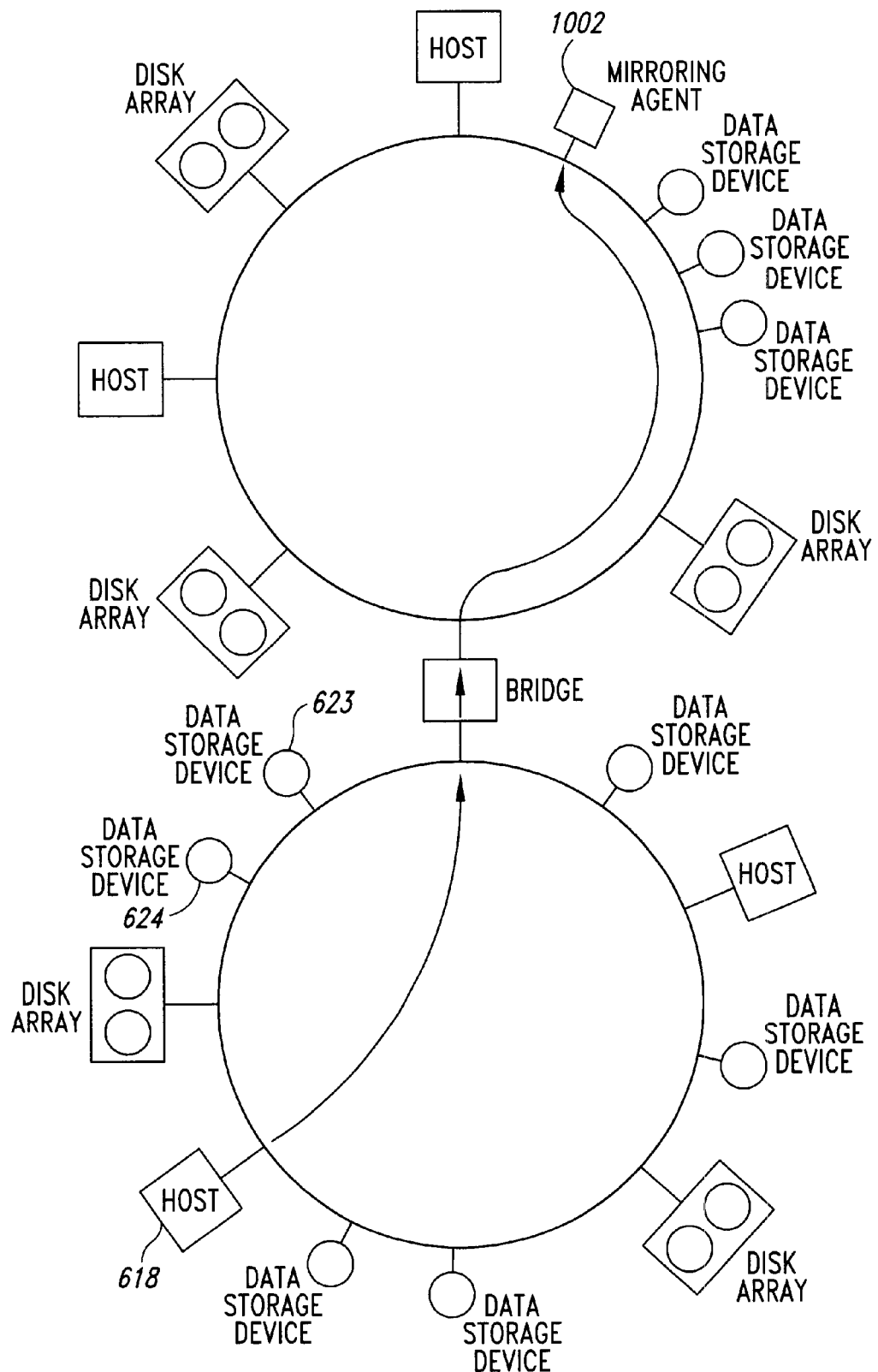
Figure 14:
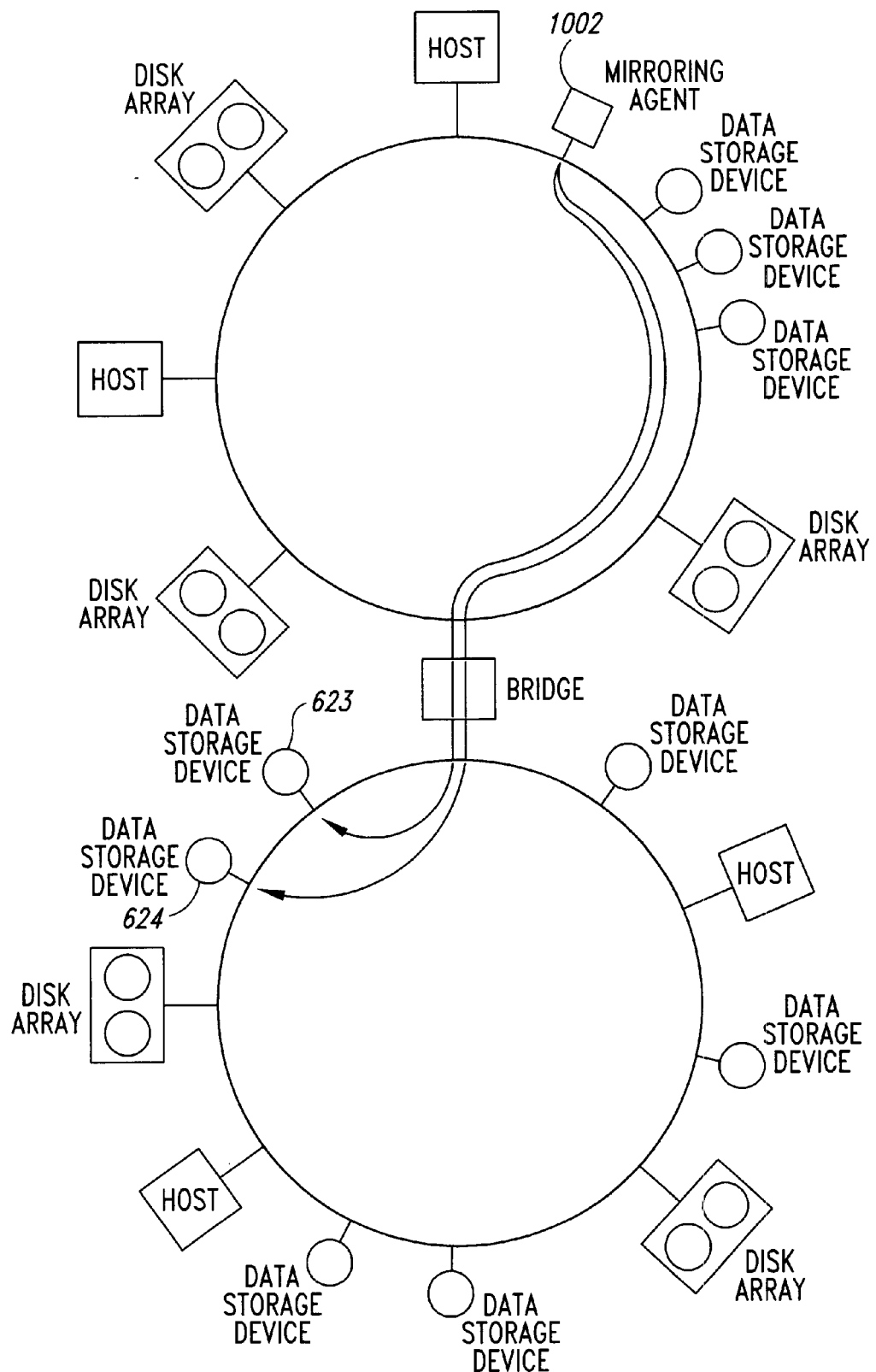

FIGS. 11–14 illustrate execution of I/O WRITE requests directed to a LUN provided via a disk-array-like interface by a mirroring agent. In FIG. 11, host computer 608 directs an I/O WRITE request to a LUN provided by the mirroring agent 1002, as indicated by arrow 1102. The LUN provided by mirroring agent 1002 is essentially a virtual LUN, with the data stored on mirrored data-storage devices 628 and 616, as previously described with reference to FIG. 6. A virtual LUN appears to an accessing remote host computer as a LUN residing at the communications medium address of the mirroring agent, but the data stored in the virtual LUN is physically stored within remote data storage devices accessed by the mirroring agent. Thus, the mirroring agent provides a virtual LUN via access to remote data storage devices. Upon receiving the I/O WRITE request from host computer 608, the mirroring agent 1002, as illustrated in FIG. 12, then directs two equivalent I/O WRITE requests to data-storage devices 616 and 628. Similarly, host computer 618 may direct an I/O WRITE request to another LUN provided by mirroring agent 1002, as shown in FIG. 13, where the second LUN a virtual LUN with actual data stored on physical data-storage devices 623 and 624. As shown in FIG. 14, upon receipt of the I/O WRITE request, the mirroring agent 1002 then directs the two equivalent I/O WRITE requests to data-storage devices 623 and 624.

Although a single mirroring agent may be incorporated into the computing environment illustrated in FIG. 6, as discussed above with reference to FIGS. 10–14, it is also possible to incorporate multiple mirroring agents into the computing environment. FIG. 15 shows the computing environment illustrated in FIG. 6 following addition of three mirroring agents 1002, 1502, and 1504. When multiple mirroring agents are available, mirroring initialization and management tasks may be shared between them in many different ways. For example, mirroring agent 1002 in FIG. 15 may initialize and manage the mirroring relationship between data-storage devices 616 and 628 while mirroring agent 1504 initializes and manages the mirroring relationship between data-storage devices 623 and 624. Mirroring agent 1502 may cooperate with mirroring agents 1002 and 1504 as a fail-over device, to which I/O operations and commands can be directed in the case that either or both of mirroring agents 1002 and 1504 fail. Alternatively, a hierarchy of mirroring agents may be established. For example, mirroring agent 1502 may provide a LUN-based interface to host computers of both communications medium 602 and 606, and may implement the LUN-based interface via LUN-based interfaces provided by mirroring agents 1002 and 1504. While mirroring agents may provide virtual LUNs by storing and accessing data on remote disk drives and disk arrays, the mirroring agent concept is more general, and can encompass initializing and managing mirroring relationships between a large variety of different types of data storage and data manipulation devices.

FIG. 16 illustrates the logical components of a mirrored data storage device environment provided to a host computer via an intermediary hardware-based mirroring agent that represents one embodiment of the present invention. In FIG. 16, the mirroring agent 1602 is attached to a communications medium 1604 along with a host computer 1606, a first data storage device 1608, and a second disk-array data-storage device 1610. In FIG. 16, a single-letter symbolic communications-medium address for each of the above-described devices is shown at the intersection of a coupling line between each device and the communications medium 1604. Thus, data storage device 1608 has communications medium address "w," host computer 1606 has communications medium address "x," mirroring agent 1602 has communications medium address "y," and disk array 1610 has communications medium address "z." The mirroring agent 1602 includes a controller 1612 and a memory 1614, similar to equivalent components within a disk array. Within the memory, which may be backed up to an internal non-volatile storage component, the mirroring agent controller 1612 maintains a device table 1616 and input and output queues 1618 and 1620. The mirroring agent controller 1612 receives I/O requests and commands directed to LUNs provided by the mirroring agent 1602, queues them in the input queue 1618, processes the queued I/O commands and operations by retrieving queued operations and commands from the input queue 1618, and queues outgoing I/O commands and operations directed to data-storage devices in output queue 1620.

The host computer 1606 maintains, generally within a volume manager, a table 1622 containing information about remote data-storage devices, or volumes, accessible to the host computer. FIG. 16 illustrates implementation of a mirroring relationship between LUN 1 provided by data storage device 1608 and LUN 2 provided by disk array 1610 via the mirroring agent 1602 to host computer 1606. In the internal mirroring agent table 1616, the mirroring agent controller has stored two entries representing LUN 2 of disk array 1610 and LUN 1 1626 of data storage device 1608. In each entry, the mirroring agent controller stores a representation of the LUN provided by the mirroring agent, in the present case LUN "1," an indication of the communications medium address of a data storage device, in the present case "z" in the first entry and "w" in the second entry, an indication of the LUN at the physical address, in the present case "2" in the first entry and "1" in the second entry, and additional information about the characteristics and parameters of the data-storage devices and configuration and management parameters associated with the data storage devices. By contrast, the host computer accesses the virtual LUN provided by the mirroring agent 1602 directly via the mirroring agents' communications medium address, as if it were a physical data storage device. Hence, in internal table 1622 within host computer 1606, a first entry 1628 represents an accessible volume at communications medium address "y," corresponding to mirroring agent 1602, on LUN "1" provided at that address, with various parameters and characteristics included in additional columns or fields of the entry, and not shown in FIG. 16. When the operating system of host computer 1606 directs an I/O operation or command to the volume associated with LUN "1" at address "y," the I/O command or request is directed to the mirroring agent 1602, which then processes the I/O request or command. If the I/O request is an I/O WRITE request, then the controller of the mirroring agent 1612 directs two equivalent I/O WRITE requests to data-storage devices 1608 and 1610, as illustrated in FIG. 12. The I/O WRITE requests may be issued together, or one or both of the I/O WRITE requests may be deferred to a later time. For example, the mirroring agent may queue one or both I/O WRITE requests in order to optimize I/O WRITE request processing by the data storage devices or in order to most efficiently balance servicing of incoming requests with processing of already received requests. For I/O READ requests, a single I/O READ request may be passed by the mirroring agent 1602 to either one of the two data-storage devices 1608 and 1610.

The host computer may also store an indication of physical device addresses of data-storage devices 1608 and 1610 in internal table 1622. Thus, in FIG. 16, the second and third entries of the internal table 1622 represent physical devices, rather than data storage volumes, provided as LUNs "1" and "2" at communications medium addresses "w" and "z," respectively. This allows the host computer to directly access data-storage devices 1608 and 1610 via raw I/O requests, rather than via I/O requests directed through volumes. For example, a host computer can direct management and administrative commands that do not change the data state of the mirrored data-storage devices directly to those storage devices, completely bypassing the mirroring agent 1602. Thus, unlike the case of the specialized-hardware mirroring device described in the background section, a host computer need not direct all I/O commands and operations to the mirrored storage devices via the mirroring agent, but can rationally distribute I/O commands and operations between the data storages devices and the mirroring agent 1602.

A hardware-based mirroring agent may receive data and status, data, and completion messages back from remote data storage devices that the mirroring agent manages, and then forward the status, data, and completion messages to host computers that initiated the I/O requests and commands that generated the status, data, and completion messages. In certain implementations, no status or completion message is returned from mirrored data storage devices upon completion of an I/O WRITE request, unless an error occurs.

A hardware-based mirroring agent is provided the locations and addresses or remote data storage devices and specifications of mirror relationships to set up and initialize through a configuration and administration interface. The hardware-based mirroring agent then provides a LUN-based interface to the remote data storage devices via a communications medium to host computers. A host computer can be directed to remap remote devices accessible via the communications medium via an automated discovery process, during which volume manager tables or host I/O tables are updated to reflect locations, addresses, and parameters and characteristics of devices detected by the host computer. The mirroring agent establishes and synchronizes groups of mirrored data storage devices using well-known disk mirroring techniques.

As with any mirrored data storage devices manager, a mirroring agent is responsible for detecting failures of mirrored devices, appropriated failing over to surviving data storage devices within a mirror group, and synchronizing failed devices that are repaired and brought back to operating status. These tasks are well-known within the art, and will not be further described. The mirroring agent also manages concurrent updating of all data storage devices within a group of mirrored data storage devices to provide for immediate fail-over when one or more data storage devices within a group of mirrored data storage devices fail.

The mirroring agent is not a single point of failure with respect to data access, since the mirroring agent can include redundant components and since host computers may access data storage devices as physical devices to bypass a failed mirroring agent. Configuration changes of mirrored data storage devices can be undertaken by a mirroring agent transparently with respect to host computers, without disrupting or even interrupting I/O activity. By correctly routing I/O WRITE requests and other I/O requests and commands that change the data state of data storage devices to a mirroring agent, and routing all other I/O requests and commands directly to data storage devices, the potential bottleneck otherwise represented by mirroring agents can be avoided. Hosts of any type and configuration may access a mirroring agent through well-known interfaces provided by disk arrays, minimizing host computer support required by mirroring agents.

Although the present invention has been described in terms of a particular embodiment, it is not intended that the invention be limited to this embodiment. Modifications within the spirit of the invention will be apparent to those skilled in the art. For example, the hardware-based mirroring agent can be extended conceptually to provide mirroring, and other administrative and configurational tasks, to remotely accessible devices of many different types, in addition to data storage devices. As discussed above, hardware-based mirroring agents may cooperate to provide more robust and more failure tolerant mirroring capabilities, and hardware-based mirroring agents can be interconnected in more complex topologies, including hierarchies and graphs, to further these ends. As discussed above, the hardware-based mirroring agent that represents one embodiment of the present invention contains many of the same components as, and is internally organized similar to, a disk array. Just like a disk array, the hardware-based mirroring agent receives I/O commands and requests via a communications medium and processes those requests, using request-processing routines that run on a controller and using various information stored and maintained in a memory component. The hardware-based mirroring agent, like disk arrays, may also include interconnection ports and many other components. However, unlike disk arrays, the hardware-based mirroring agent manages, and provides an interface to, remote data storage devices and other remote devices rather than to internal data storage devices, as in the case of a disk array. As with disk arrays, there are an almost limitless number of different hardware, firmware, and software implementations of the various internal components. Implementation of I/O request and command processing is dependent on the communications medium through which the hardware-based mirroring agent accesses the data storage devices which it provides an interface to, and the communications protocols through which the hardware-based mirroring agent intercommunicates with host computers is also dependent on the communications medium and on the protocol engines employed by the host computers. Many of these different alternative embodiments of hardware, firmware, and software components are well-known to designers and manufacturers of disk arrays. A hardware-based mirroring agent may be interconnected to various remote devices through one or more communications media of various different types, and can intercommunicate with one or more host computers. The hardware-based mirroring agent can provide well-known and common mirroring functionality including mirror splits, dynamic reconfiguration of mirrors, dynamic addition of additional physical devices to a group of mirrored devices, mirror concurrency and synchronization, and mirror initialization. The hardware-based mirroring agent may combine two or more physical devices to create a logical mirrored device. In addition to mirroring, a hardware-based mirroring agent may also undertake various backup, archival, data compression and decompression, and other data manipulation operations for virtual LUNs provided to host computers implemented via remote data storage systems. The described embodiment featured a fibre channel communications medium, but any other communication medium that can support data storage and retrieval operations between host computers and data storage devices can also be employed to interconnect the mirroring agent with host computers and data storage devices, including communications media supporting the Internet Protocol, and others. Additionally, multiple communications media may be used for host/mirroring agent interconnection and mirroring agent/data storage device interconnection.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A mirroring agent comprising:
    a communications port coupled to a communications medium through which the mirroring agent receives requests, commands, and status messages and through which the mirroring agent sends requests and commands, the communications port associated with an address;
    a memory that stores received incoming requests and commands and outgoing requests and commands received and transmitted via the communications port; and
    a controller that executes routines that provide a virtual logical unit interface to a host computer accessing the mirroring agent via the communications medium and that implements the virtual logical unit interface by issuing requests and commands to at least two data storage devices remote to the mirroring agent and accessible by the mirroring agent via the communications medium and communications medium addresses associated with the at least two data storage devices, the at least two data storage devices continuously updated to be mirrors of one another.

2. The mirroring agent of claim 1 wherein the communications medium is a fibre channel communications medium.

3. The mirroring agent of claim 1 wherein the communications medium supports the Internet Protocol.

4. The mirroring agent of claim 1 wherein the at least two data storage devices are disk arrays.

5. The mirroring agent of claim 1 wherein the host computer discovers the virtual logical unit, via a communications medium discovery process, at the communications address associated with the mirroring agent, and maintains an internal indication associating the virtual logical unit with an indication of the communications address associated with the mirroring agent.

6. The mirroring agent of claim 5 wherein the host computer discovers the at least two data storage devices, via a communications medium discovery process, at the communications address is associated with the at least two data storage devices, and maintains internal indications associating the at least two data storage devices with indications of the communications addresses associated with the at least two data storage devices.

7. The mirroring agent of claim 6 wherein the host computer directs read and write requests to the virtual logical unit via the communications address associated with the mirroring agent, and may direct administrative and management commands directly to one or more of the at least two data storage devices via one or more of the communications addresses associated with the at least two data storage devices.

8. The mirroring agent of claim 1 wherein the mirroring agent is interconnected with a host computer via a first communications medium and a first communications-medium port and interconnected to the data storage devices via a second communications medium and a second communications-medium port.

9. A method for providing mirrored data storage devices to a host computer, the method comprising:
    providing a mirroring agent that includes a communications medium port, memory, and a controller, and that is associated with a communications medium address;
    providing to the host computer via a communications medium a logical unit interface; and
    implementing the logical unit interface by the mirroring agent by
        receiving requests and commands from the host computer directed to the logical unit interface, and
        forwarding requests and commands to at least two data storage devices remote from the mirroring agent and associated with communications medium addresses via the communications medium so that the at least two data storage devices are continuously updated to each maintain a single consistent data state that corresponds to a mirror relationship among the at least two data storage devices.

10. The method of claim 9 further including receiving, by the mirroring agent, directives to establish a mirror relationship between at least two data storage devices, whereupon the mirroring agent synchronizes the at least two data storage devices and provides a logical unit interface to the at least two data storage devices.

11. The method of claim 9 further including discovering, by the host computer, the logical unit interface provided by the mirroring agent to the at least two data storage devices via a communications medium discovery process, and storing an indication of the communications address associated with the mirroring device along with and indication of the logical unit interface.

12. The method of claim 9 further including discovering, by the host computer, the communications addresses associated with the at least two data storage devices via a communications medium discovery process, and storing indications of the communications addresses associated with the at least two data storage devices.

13. The method of claim 12 further including accessing the at least two data storage devices by the host computer via the logical unit interface provided by the mirroring agent using the stored indication of the communications address associated with the mirroring device.

14. The method of claim 13 further including accessing the at least two data storage devices directly by the host computer using the stored indications of the communications addresses associated with the at least two data storage devices.

* * * * *